United States Patent Office 3,720,051
Patented Mar. 13, 1973

3,720,051
GROUND COVER FRUIT HARVESTING MACHINE
Graeme R. Quick, Ames, Iowa, assignor to Iowa University Research Foundation, Inc., Ames, Iowa
Filed Nov. 26, 1971, Ser. No. 202,271
Int. Cl. A01g 19/00
U.S. Cl. 56—330                          10 Claims

ABSTRACT OF THE DISCLOSURE

A ground cover fruit harvesting machine comprises a wheel-mounted supporting frame having forward and rearward ends, and having a plurality of laterally spaced tooth elements extending forwardly therefrom. Each of the tooth elements has a longitudinal slot therein. A picking element is mounted for sliding movement within each of the slots of the tooth elements, and means are provided for oscillating the picking elements within the slots.

---

This invention relates to a ground cover fruit harvesting machine.

Many machines have been provided for mechanizing the harvest of low-growing fruits and vegetables such as strawberries, tomatoes, and the like. One of the problems connected with harvesting these fruits is providing a mechanism which treats the fruit gently so as not to bruise or damage them during the picking process.

The general principle of the present invention is the provision of a device which will penetrate the plant crowns with fingers and gently remove the fruit by means of movable walker-picker elements which are installed within stationary teeth. The motion of the walker-pickers is such as to detach the fruit and remove it rearwardly to the cleaning and lifting stations on the harvesting machine.

Therefore a primary object of the present invention is the provision of a ground cover fruit harvesting machine which will detach the fruit from the plant and remove it to a conveyor.

A further object of the present invention is the provision of a ground cover fruit harvesting machine which treats the fruit gently so as to minimize bruising and other injury to the fruit.

A further objecto f the present invention is the provision of a ground cover fruit harvesting machine which includes picking elements for detaching and removing the fruit from the plant.

A further object of the present invention is the provision of a ground cover fruit harvesting machine having forwardly and rearwardly reciprocating picking elements which are shielded when they move forwardly and which engage and carry the fruit away when they move rearwardly.

A further object of the present invention is the provision of a ground cover fruit harvesting machine which picks the fruit by lifting it and pulling it against the stems.

A further object of the present invention is the provision of a ground cover fruit harvesting machine which includes stationary teeth which enshroud oscillating picking elements, the stationary teeth being capable of penetrating the plant foliage in a combing action while at the same time shielding the foliage from the oscillating picking elements.

A further object of the present invention is the provision of a device which is economical to manufacture and durable to use.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
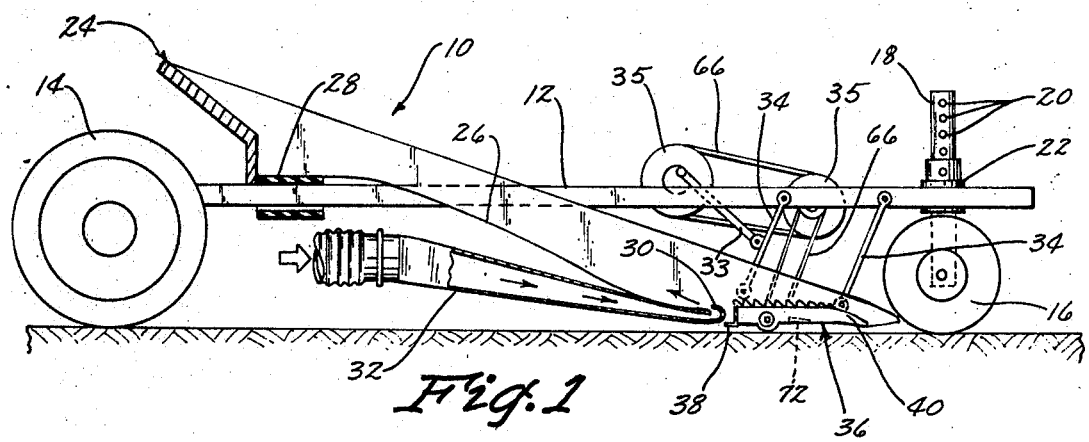
FIG. 1 is an elevational view of the fruit harvesting device.
Figure 2:
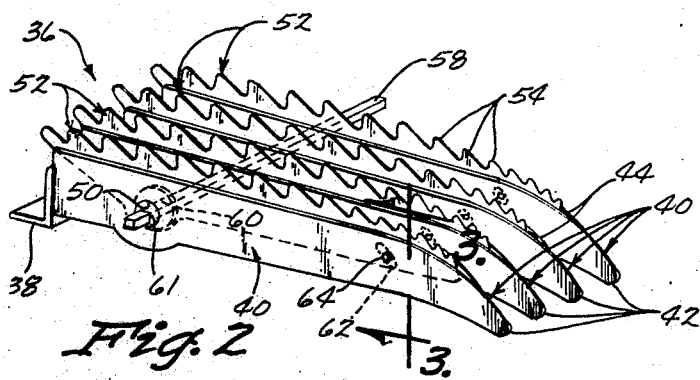
FIG. 2 is a fragmentary perspective view illustrating the picker-head assembly and the reciprocating picker elements mounted within the stationary teeth.

Referring to the drawings the numeral 10 generally designates the ground cover fruit harvesting machine of the present invention. A main frame 12 includes a rear wheel 14 operatively mounted at its rearward end and a pair of forward wheels 16 mounted at its forward end. Forward wheels 16 are rotatably mounted on the lower end of an upstanding member 18 having a plurality of adjustment apertures 20 extending therethrough. Upstanding member 18 is vertically slidably mounted within a mounting bracket 22 which in turn is rigidly secured to the forward end of main frame 12. Bolt means (not shown) extend through apertures 20 to secure upstanding member 18 in any of a plurality of selected positions within mounting bracket 22. This structural arrangement permits the adjustment of the height at which frame 12 is supported above the ground adjacent its forward end.

Rigidly mounted to frame 12 is an elevation and conveyor assembly 24. Conveyor assembly 24 includes an air elevation ramp 26 which is inclined and which includes at its upper end a cross conveyor 28. Mounted adjacent the lower end of ramp 26 is a blower spout 30 which is connected by means of a conduit 32 to a source of air such as a fan (not shown). Blower spout 30 is adapted to direct air from the fan upwardly along the upper surface of elevation ramp 26, and thereby blow the fruit which has been picked upwardly to cross conveyor 28. All this structure described above is known in the art, as illustrated in the above-referred to patent.

Mounted to frame 12 by means of a connecting rod 33 and struts 34 is a picker head assembly 36. Struts 34 are pivoted at their upper ends to frame 12 and at their lower ends to picker assembly 36 so as to provide a parallelogram swing-like mounting for picker assembly 36. Connecting rod 33 is pivoted at its lower end to one of struts 34 and at its upper end it is pivotally mounted to one of rotating pulleys 35. As can be seen in FIG. 1, connecting rod 33 is eccentrically mounted with respect to the center of pulley 35 so that rotation of pulley 35 causes connecting rod 33 to shake the whole picker head assembly 36 for better penetration of the foliage. This means for shaking picker head assembly 36 is optional, and means (not shown) could also be used for rigidly mounting assembly 36 to frame 12, if desired.

Figure 3:
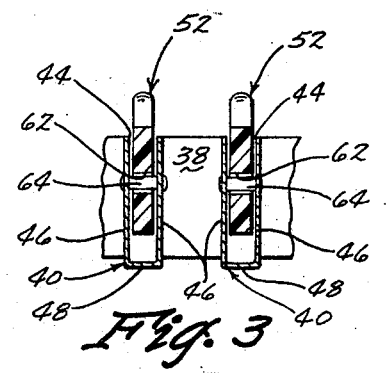
FIG. 3 is a sectional view taken along line 3—3 of FIG. 2.

Assembly 36 includes an angle iron cross-frame member 38. Extending forwardly from frame member 38 are a plurality of spaced parallel stationary teeth 40. Teeth 40 are elongated and have rounded forward noses 42 which are angled slightly downwardly. Each tooth 40 is U-shaped in cross section as can be readily seen in FIG. 3 so as to provide an elongated slot 44 therein. Slot 44 terminates short of the forward ends of teeth 40 so that noses 42 present a smooth surface for engaging the foliage of the plants to be picked. The U-shaped cross sectional shape of teeth 40 provides a pair of side walls 46 and a bottom wall 48. Extending through slot walls 46 adjacent their rearward ends is a circular opening 50.

Slidably mounted within slot 44 is a picker element 52 which is elongated and which includes a slight tapered shape adjacent its forward end. A plurality of serrations 54 are provided on the upper edge of picker element 52. Serrations 54 are slanted rearwardly. Adjacent the rearward end of picker element 52 is a large opening 56 which is considerably larger than opening 50 in side walls 46.

Extending through openins 50 of the side walls 46 and also extending through openings 56 of picker elements 52 is an elongated drive shaft 58 which is square in cross section. Drive shaft 58 includes a plurality of cams 60 along its length which are adapted to fit between side walls 46 of each tooth 40 and within large opening 56 of picker elements 52. Cam 60 is eccentrically mounted within respect to drive shaft 58 so that rotation of drive shaft 58 causes cam 60 to move in an eccentric motion. A circular bearing flange 61 is provided on drive shaft 58 and is rotatably mounted within circular opening 50 of side walls 46.

Figure 4:
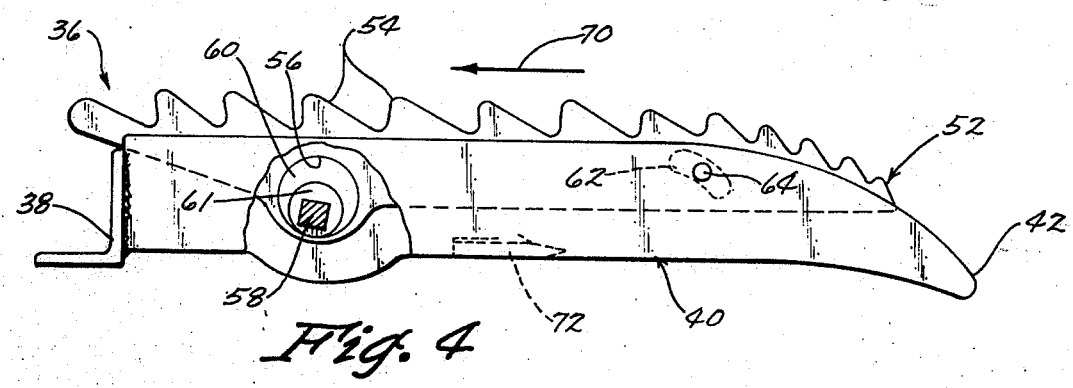
FIG. 4 is an enlarged elevational view of one of the stationary teeth having the reciprocating picker element mounted therein.

Adjacent the forward end of picker element 52 is an arcuate slot 62. A pin 64 is rigidly mounted between side walls 46 (FIG. 4) and extends through arcuate slot 62.

Drive shaft 58 is driven by a plurality of belt 66 (FIG. 1) which are trained around pulleys 35 rotatably mounted on frame 12 and also around a pulley (not shown) which is mounted on shaft 58. At least one pulley 35 is adapted to be connected to a power source such as the power take-off from a tractor.

Rotation of drive shaft 58 causes cams 60 to move eccentrically about the rotational axis of shaft 58. This eccentric motion of cams 60 causes picker elements 52 to move in an oscillating path with pins 64 guiding the motion of picker elements 52 by virtue of their slidable mounting within arcuate slot 62. The motion which is imparted to picker elements 52 is as follows: Elements 52 are initially positioned so that serrations 54 protrude upwardly above the upper ends of elongated slots 44. Cam 60 moves picker elements 52 rearwardly in the direction indicated by arrows 70. When picker elements 52 reach their extreme rearward position they are pulled downwardly by cam 60 so that serrations 54 are below the upper edge of slots 44. Picker elements 52 then begin their motion forwardly with serrations 54 being positioned below the upper ends of slots 44. When picker elements 52 have returned to the extreme forward position cam 60 again lifts picker elements 52 so that serrations 54 are protruding above the upper ends of slots 44. The above described cycle of motion is controlled by virtue of cams 60 and arcuate slot 62 so that serrations 54 are extending upwardly above the upper end of slots 44 when they are being drawn rearwardly and serrations 54 are shielded by stationary teeth 40 when picker elements 52 are being returned to their forward position. Thus the fruit being picked and the stems of the plants on which the fruit is growing come in contact with the picker elements 52 only when picker elements 52 are moving rearwardly. Stationary teeth 40 shield the plants from picker elements 52 when picker elements 52 are moving forwardly.

The drawings illustrate a cutting knife 72 which is secured to the lower edges of stationary teeth 40 and which extends across picker-head assembly 36 in a direction parallel to drive shaft 58. Cutting knife 72 is optional and may be removed without detracting from the invention.

Thus it can be seen that the device accomplishes at least all of its stated objectives.

I claim:

1. A ground cover fruit harvesting machine comprising:
   a frame having a picker head assembly at its forward end,
   a conveying means for conveying fruit rearwardly from said picker head assembly,
   said picker head assembly comprising a plurality of laterally spaced elongated forwardly extending tooth elements, each of said tooth elements having longitudinally extending slot therein,
   an elongated picking element mounted for sliding movement within each of said slots of said tooth elements; and
   means for oscillating said picking elements in said slots.

2. A machine according to claim 1 wherein each of said slots include an open upper end, said picking elements being slidably movable forwardly, rearwardly, upwardly, and downwardly within said slots; said picking elements being enclosed within said slots when moving forwardly therein, and extending above said upper ends of said slots when moving rearwardly therein.

3. A machine according to claim 1 wherein said oscillating means includes cam means engaging said picking elements for causing said picking elements to oscillate in an enclosed path.

4. A machine according to claim 3 wherein said cam means includes a cam member rotatably extending through an opening in each of said picking elements, said opening being larger than said cam member and said cam member being rotatable eccentrically about a rotational axis so as to impart an oscillating motion to said picking elements.

5. A machine according to claim 4 wherein a second arcuate opening extends through each of said picking elements; a guide pin being fixed to each of said tooth elements and extending through said second arcuate opening in said picking elements whereby said guide pin cooperate with said second arcuate opening to control the oscillating movement of said picking element.

6. A machine according to claim 1 wherein each of said picking elements includes an upper edge and each of said slots includes an open upper end, said upper edge protruding upwardly above said upper end of said slot at least some of the time during oscillation of said picking element.

7. A machine according to claim 6 wherein said upper edge of said picking element is serrated.

8. A machine according to claim 7 wherein said oscillating means includes a cam engaging said picking elements and moving said picking elements forwardly and rearwardly within said slots.

9. A machine according to claim 8 wherein said cam moves said upper edges below said upper ends of said slots when said picking elements are moving forwardly and said cam moves said upper edge above said upper ends of said slots when said picking elements are moving rearwardly.

10. A machine according to claim 1 comprising vibration means connected to said picker head assembly for imparting arcuate vibrating motion to the picker head assembly, said picker head assembly being vibrated in a reciprocating direction parallel to the direction of travel of the frame.

References Cited

UNITED STATES PATENTS

| | | | |
|---|---|---|---|
| 3,415,400 | 12/1968 | Olin | 56—362 X |
| 379,341 | 3/1888 | Strub et al. | 56—363 |
| 1,133,789 | 3/1915 | Becht et al. | 198—219 X |
| 2,671,301 | 3/1954 | Harrison | 198—219 X |
| 2,607,180 | 8/1952 | Stankavich et al. | 56—330 |

ANTONIO F. GUIDA, Primary Examiner

J. A. OLIFF, Assistant Examiner

U.S. Cl. X.R.

56—362; 198—219